US008707325B2

(12) United States Patent
Seyvet

(10) Patent No.: US 8,707,325 B2
(45) Date of Patent: Apr. 22, 2014

(54) RETRIEVING AN OBJECT

(75) Inventor: Nicolas Seyvet, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/063,053

(22) PCT Filed: Oct. 1, 2008

(86) PCT No.: PCT/EP2008/063188
§ 371 (c)(1),
(2), (4) Date: Mar. 9, 2011

(87) PCT Pub. No.: WO2010/037419
PCT Pub. Date: Apr. 8, 2010

(65) Prior Publication Data
US 2011/0191791 A1    Aug. 4, 2011

(51) Int. Cl.
*G06F 3/00* (2006.01)
*G06F 15/16* (2006.01)
(52) U.S. Cl.
USPC .......................................... 719/310; 709/217
(58) Field of Classification Search
USPC .......................................... 719/310; 709/217
See application file for complete search history.

(56) References Cited

U.S. PATENT DOCUMENTS

| | | | | |
|---|---|---|---|---|
| 7,366,762 | B2 * | 4/2008 | Cama | 709/206 |
| 7,496,622 | B2 * | 2/2009 | Brown et al. | 709/203 |
| 2002/0143984 | A1 * | 10/2002 | Hudson Michel | 709/238 |
| 2003/0229529 | A1 * | 12/2003 | Mui et al. | 705/8 |
| 2004/0059748 | A1 | 3/2004 | Cox et al. | |
| 2006/0041871 | A1 * | 2/2006 | Friedman et al. | 717/136 |
| 2007/0101061 | A1 * | 5/2007 | Baskaran et al. | 711/118 |
| 2008/0313318 | A1 * | 12/2008 | Vermeulen et al. | 709/223 |

OTHER PUBLICATIONS

Marlon Pierce, Application Web Services, 2002.*
International Search Report for PCT/EP2008/063188, mailed Sep. 15, 2009.
International Preliminary Report on Patentability with 2 Amended Sheets for Int'l. Application No. PCT/EP2008/063188, dated Jul. 28, 2010.
Sailhan, F. et al., "Scalable Service Discovery for MANET", Pervasive Computing and Communications, (Mar. 8, 2005), pp. 235-244.
Macaire, A., "An open and secure terminal infrastructure for hosting personal services", Technology of Object-Oriented Languages 2000, (Jun. 5, 2000), pp. 10-21.
java.sun.com/blueprints/corj2eepatterns/Patterns/ServiceLocator.html.
theregister.co.uk/2007/01/23/ejb web services, Jan. 23, 2007.
en.wikipedia.org/wiki/Factory_method_pattern.

* cited by examiner

*Primary Examiner* — Lechi Truong
(74) *Attorney, Agent, or Firm* — Nixon & Vanderhye, P.C.

(57) ABSTRACT

A method of locating an object across a network comprises locating the copy of object that is the best copy available through either JNDI object location and webservice location. The method initially comprises attempting to locate a local copy of the object (step 8). If a local copy of the object is not located, the method then attempts (step 10) to locate a remote copy of the object. If a remote copy of the object is not located, the method then attempts (step 12) to locate a remote web service object.

13 Claims, 3 Drawing Sheets

RETRIEVING AN OBJECT

This application is the U.S. national phase of International Application No. PCT/EP2008/063188, filed 1 Oct. 2008, which designated the U.S., the entire contents of which is hereby incorporated by reference.

TECHNICAL FIELD

The invention relates to a method of retrieving an object across a network, and in particular to a method that bridges JNDI (Java Naming and Directory Interface) lookup and web service location to retrieve the copy of the object that is the best copy available through either JNDI look-up or web service location.

BACKGROUND

The Java Naming and Directory Interface is an interface that allows clients to look-up an object (a data item) via a name. The Java Naming and Directory Interface essentially provides a mechanism for binding an object to a name, and a directory lookup interface that allows a client who wises to retrieve an object to enter a query.

Service locators that use JNDI for location of a service object are known. This addresses the problem that different clients use JNDI in different ways, for example EJB (Enterprise JavaBeans) clients use JNDI to look up EJBHome objects by using the enterprise bean's registered JNDI name, where JMS (Java Messaging Service) clients need to look up JMS components by using the JNDI names registered for JMS components. It proposes a "Service Locator object" that can abstract all JNDI usage and hide the complexities of initial context creation, EJB home object lookup, and EJB object re-creation. Multiple clients can reuse the Service Locator object to reduce code complexity and provide a single point of control.

However, with EJB 3.0 (Enterprise JavaBeans 3.0) and IOC (Inversion of Control), the usefulness of the existing Service Locator pattern is reduced as beans are injected with annotations instead of being looked up from the JNDI. Furthermore, it covers only abstraction of the JNDI usage and initial context creation.

SUMMARY

A first aspect of the invention provides a method of retrieving an object. The method comprises retrieving the object that is the best available through either JNDI object location and webservice location. The term "best available object" denotes the copy of the object that can be retrieved most quickly.

The invention thus bridges the JNDI object location and webservice location, and provides increased probability of successful retrieval of an object compared to use of JNDI alone while allowing more efficient retrieval of an object than if web service location alone is used.

Web service location using EJB 3 is also know.

The invention may comprise, in response to a request to retrieve an object, initially carrying out a JNDI search for the object. If the JNDI search locates a copy of the object the object is retrieved, but if the JNDI search does not locate a copy of the object, web service location is used to try to locate a remote web service object. In general, web service location is at significantly slower in retrieving an object than a JNDI search. Thus, attempting to locate the object with a JNDI search and using a web service location only if the JNDI fails to locate a copy of the object should reduce the time taken to locate a copy of the object.

Carrying out the JNDI search may comprise initially attempting to locate a local copy of the object. If a local copy of the object is located this is retrieved, but if a local copy is not located, the method then attempts to locate a remote copy of the object. Invoking a request across a local JNDI call is approximately 5-6 times faster than invoking the request across a remote call, so that initially attempting to locate a local copy of the object should reduce the time taken to locate a copy of the object.

The method may comprise attempting to locate a requested object in a cache before attempting to retrieve the object.

The method may comprise caching a retrieved object. Caching a retrieved object means that the search cost is incurred only when the first request for an object is received, as subsequent requests for that object can be met by returning the cached copy of the object (assuming that it is still up-to-date).

Other aspects of the invention provide a corresponding apparatus and a corresponding storage medium.

BRIEF DESCRIPTION OF THE DRAWINGS

Preferred embodiments of the present invention will now be described by way of illustrative example with reference to the accompanying drawings in which.

DETAILED DESCRIPTION

The present invention is based on a service locator pattern. However, the invention extends the known service locator so that it can abstract all WS (web service) and JNDI usage and so provide more comprehensive object location than is possible using only JNDI. The service locator of the invention is still able to hide complexities of initial object creation, web service binding, EJB home land remote lookup from users, and so is user-friendly. Multiple clients can reuse the service locator to reduce code complexity, provide a single point of control and improve performance by providing a best available protocol call optimization.

The service locator uses the factory design pattern to provide a single point of control for the different objects to find. As is known the "factory design pattern" is an object-oriented design pattern that can create objects without specifying the exact class of object that is to be created.

In an advantageous implementation, the service locator uses a simple algorithm that will attempt to return the best possible object available by carrying out the following three steps:

1. Try to locate a local object;
2. if 1 failed, try to locate a remote object;
3. if 2 failed try to locate a remote web service object In a particularly advantageous embodiment an object located in response to a user request is cached. In this embodiment the algorithm may further include, before carrying out step 1 of trying to locate a local object, determining whether the requested object is already available (because it has been cached following an earlier search) and, if a cached copy is available, determining whether the cached copy is still up-to-date. If an up-to-date cached copy of the requested object is available, the cached copy would be returned and there would be no need to carry out steps 1, 2 or 3. This is described further below.

In another advantageous implementation, the protocol call optimization of the service locator is configurable, and if no optimization is selected then web services are the default— that is, if no optimization is selected the service locator would not try steps 1 and 2 above, but would go straight to step 3.

Figure 1:
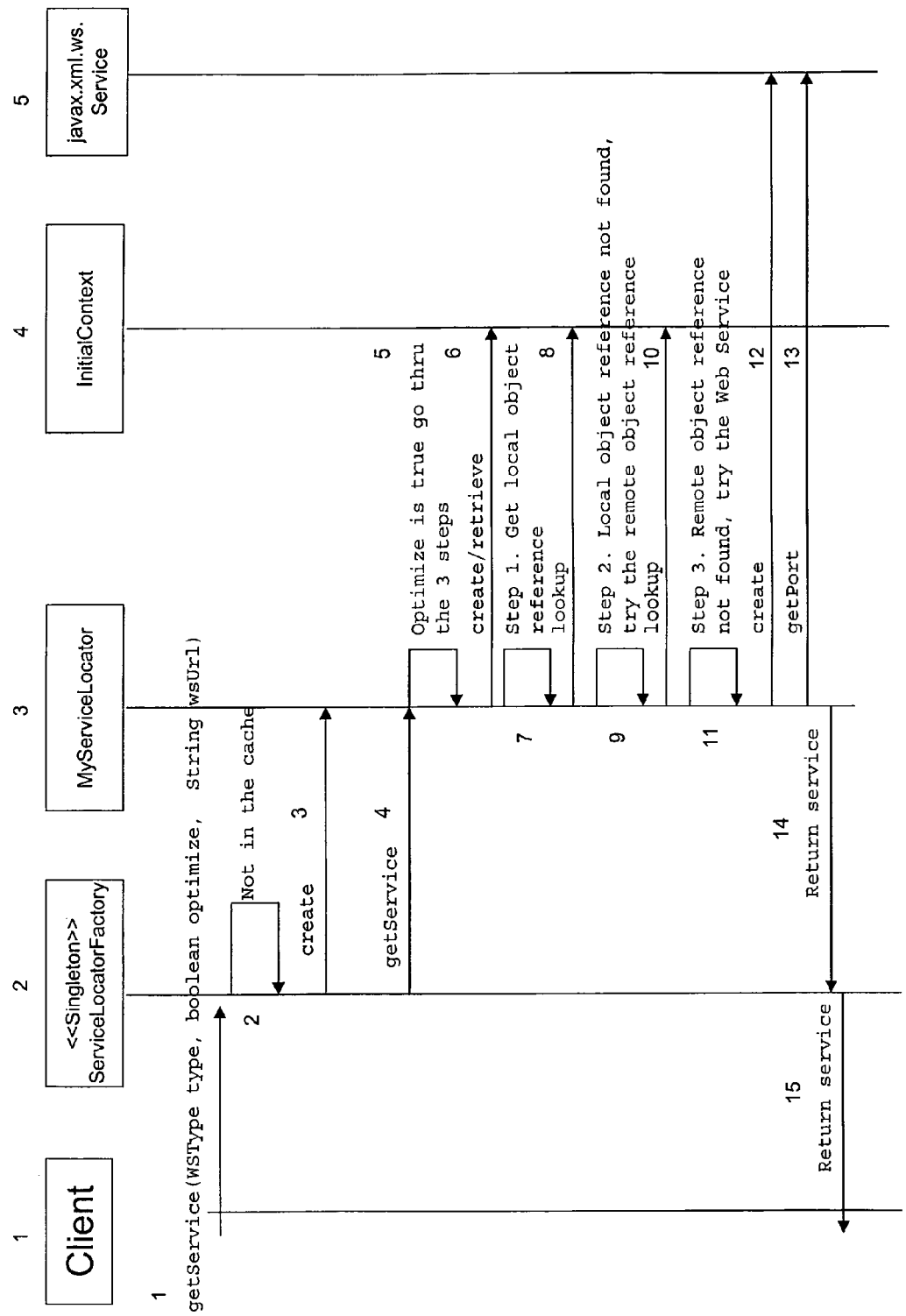
FIG. 1 is a block flow diagram showing principal step of a method of the invention.

FIG. 1 is a schematic block flow diagram showing an embodiment of the invention.

Initially, at step 1, a Service Locator Factory (SLF) receives a request for an object from a client 1. The object is identified in the request by a web service address such as a URL. In FIG. 1 the request is shown as identifying the type of web service as well as identifying the web service itself, but the invention is not limited to any specific format for the request.

In FIG. 1 the request is also shown as indicating that an optimisation protocol of the invention should be used, by the field "boolean optimisation" in the request. If the flag indicates that no optimization is selected the service locator would not try steps 1 and 2 above, but would go straight to step 3 of attempting to locate a remote web service object-- this allows, for example, a system administrator to disable the use of the optimisation protocol of the invention if desired.

In an advantageous embodiment, the SLF 2 keeps a cached copy of objects that it retrieves as to optimize calls from other clients. If the SLF does maintain a cache, upon receipt of a request for an object it checks (step 2) whether the requested object is present in the cache and whether any parameters of the requested object have changed (for example the url). If the requested object is present in the cache and the parameters are identical this indicates that the cached copy of the object is still up to date, and the cached copy of the object may be returned to the client 1 at step 15. However, if the requested object is present in the cache but the parameters have changed since the object was cached, this indicates that the cached copy of the object is no longer up to date and so is not suitable to be returned to the client 1.

If the SLF has never previously retrieved the requested object, the result of step 2 will of course be that the requested object is not present in the cache.

If the SLF does not maintain a cache, step 2 is omitted.

If step 2 does not locate an up-to-date copy of the object, or is not carried out, the SLF 2 then proceeds to create a service locator SL 3, at step 3, and sends a request for the service requested by the client to the SL at step 4.

The method then checks at step 5 whether the SL is configured to use protocol call optimization. If the SL is configured to use this optimisation (if "optimise is true"), the method attempts to locate the requested objected using JNDI look-up initially and then searching for a remote web service object if the JNDI look-up does not locate the object.

In the embodiment of FIG. 1, if step 5 determines that the SL is configured to use protocol call optimization the method applies the three-step algorithm described above. That is, the method attempts to find the local reference object through the SL by initially performing a lookup for local object using JNDI. To do this an initial context 4 is created at step 6 or alternatively, depending on the language and the framework, a link to the initial context may be created (for example with EJB 3.0 a link is injected). As a further alternative, the initial context may be retrieved by performing a new InitialContext routine with the EJB container. Next, a local object reference is created at step 7, and a JNDI lookup for a local object is carried out at step 8. If the object is retrieved, it is returned to the SLF 2 at step 14.

In a modification, it would be possible to select not to use JNDI in the local object look-up, and instead bind to a local object available within the Java Virtual Machine thereby bypassing JNDI.

If the lookup for a local object at step 8 is unsuccessful, the SL then performs a lookup for a remote object using JNDI. To do this a remote object reference is created at step 9, and a JNDI lookup for a remote object is carried out at step 10. If the object is retrieved, it is returned to the SLF 2 at step 14.

If the JNDI lookup for a remote object at step 10 is unsuccessful, the SL then determines at step 11 to perform a lookup for a remote web service object. A link to a web service client factory is created at step 12 and a port is obtained at step 13. If the object is retrieved, it is returned to the SLF 2 at step 14.

At step 15 the retrieved object is returned to the client 1.

If the SLF maintains a cache, any object returned to the SLF at step 14 may be added to the cache.

One important advantage of using the Service Locator 3 is implicit optimization of calls between applications collocated in the same J2EE (Java 2, Enterprise Edition) container. Using the service locator, a request is only resolved as a web service search if a local object or a remote (RMI—Remote Method Invocation) object is not available. Measurements on JBoss show that invoking a simple web service object location request with only one argument is on average 70 times slower than a local call, and 12 times slower than an RMI call. Latency is also improved, as the CPU used when optimizing is reduced when compared to an equivalent WS call.

A further advantage is that the Service locator makes the optimization protocol transparent to the user. The user simply requests an object and (hopefully) receives the requested object, and is unaware of the method (ie, JNDI look-up or remote web service object look-up) used to retrieve the object.

The method of FIG. 1 may be performed in any suitably programmed network node, and in general is carried out at an Application Server (AS) that can implement the SLF. No new hardware is required to implement the invention.

Figure 2:
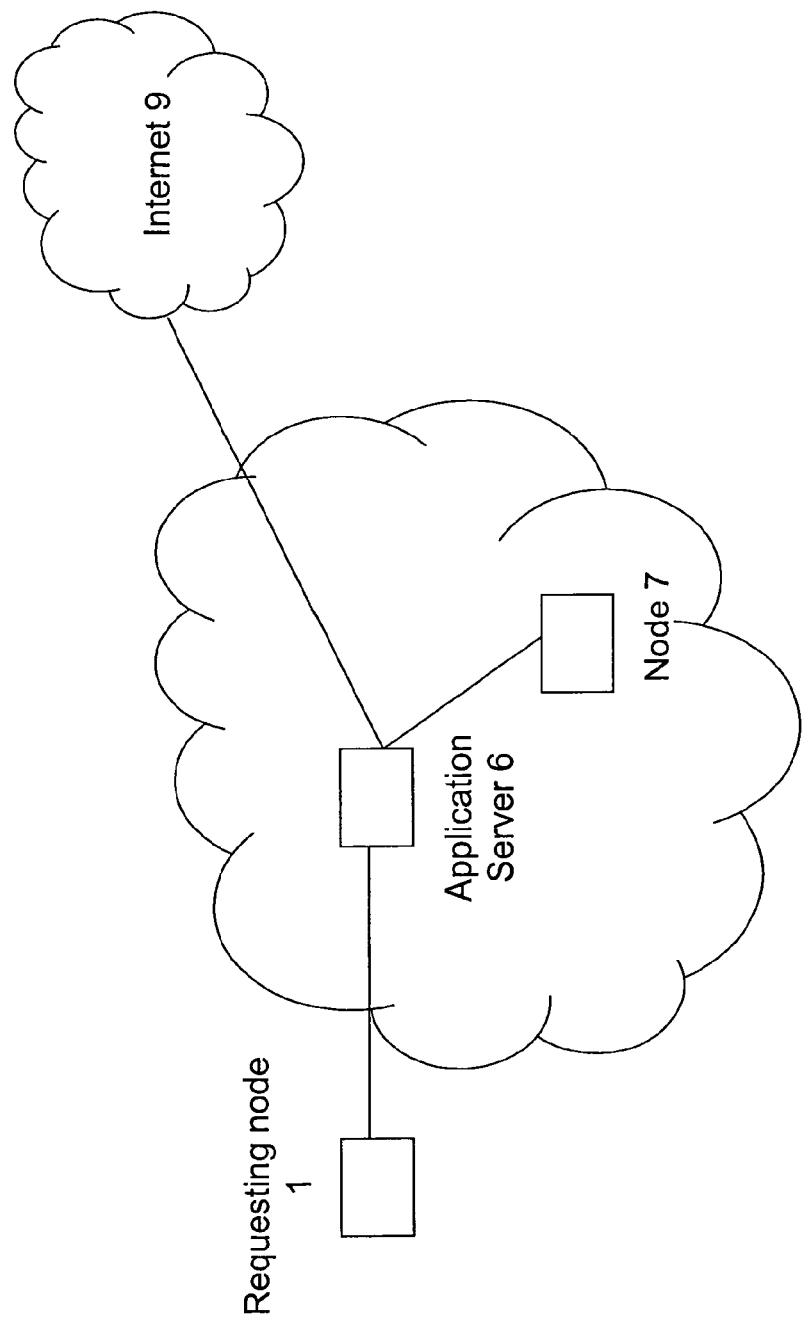
FIG. 2 is a block schematic diagram of an apparatus of the invention.

FIG. 2 is a block schematic diagram showing a network 8 containing a node 6, for example an application server 6, that can implement the method of the invention. A node 1 that requires an object sends a request to the application server 6. The node 1 is shown as external to the network 8, but the node 1 could alternatively be within the network 8.

When the application server 6 receives the request from the node 1, and executing the request would involve an external service invocation, the application server 6 will attempt to locate that object in accordance with a method of the invention as described above. In an advantageous embodiment, the application server 6 will attempt to locate the object using the optimisation protocol described above in which the application server 6 initially looks for a local object. If a local object cannot be found, the application server 6 then looks for a remote object, that is an object located at another node of the network 8 (as schematically indicated in FIG. 2 by node 7). If a remote object cannot be found, the application server 6 then attempts to locate a remote web service object (as schematically indicated in FIG. 2 by the application server 6 launching an enquiry to the Internet 9).

In FIG. 2, the node 1 is a client of the application server 6, and the application server 6 is a client of the node 7 or the Internet 9. In the embodiment of FIG. 2, the application server 6 implements the SLF 2, SL 3, Initial Context 4 and web service client factory 5 of FIG. 1.

Figure 3:
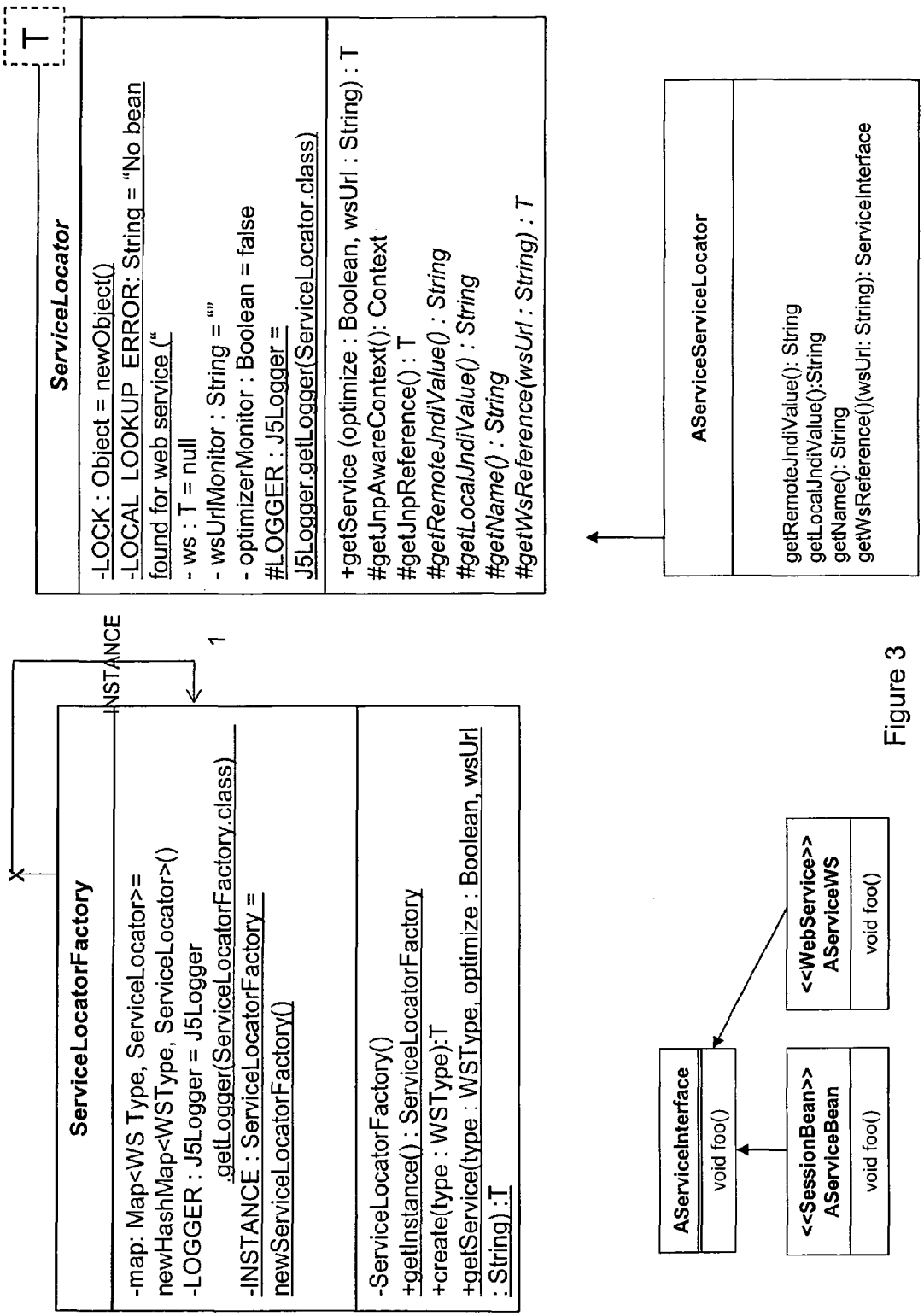
FIG. 3 is a class diagram.

FIG. 3 is a class diagram illustrating the invention. In FIG. 3:

AServiceInterface is the base interface used by local or remote or WS implementation class.

AServiceBean is the Session Bean implementation which can be a remote or local EJB.

AServiceWS is the WebService implementation.

AServiceServiceLocator contains the necessary code to perform the specific code for this service (AService). It is mostly a holder of constant values such as the service name and JNDI name.

ServiceLocator is an abstract class that contains the logic common to all sub-interfaces.

ServiceLocatorFactory is an abstract factory (from the abstract factory design pattern).

WSType (not shown in diagram) is an enum list of all possible ServiceLocator implementation (this simplifies the look up and reduces casting errors if using String for example).

Note that it is possible to have AServiceBean and AServiceWS as the same class using EJB 3.0 annotations.

For the class diagram of FIG. 3, invoking:
ServiceLocatorFactory->getService(WSType type, boolean optimize, String wsUrl) throws MtvConfigurationException (MtvConfiguration is a Java Exception, and may be replaced by java.lang.Exception or simply Exception. The class Exception is a subclass of the Throwable class in the Java language, and is conventionally used to indicate that an exceptional situation has occurred.) This will return the optimized implementation of the service AService.

In addition the ServiceLocatorFactory may keep a cached copy of the latest obtained service so as to optimize calls from other clients.

On an attempt to retrieve the AService object, one of the methods described above is followed.

The present invention may be employed generally to locate an object across a network, and is not limited to any one particular use. It may be used in a mobile system, or in a fixed system.

The invention claimed is:

1. A method of locating, in response to an object request, a copy of an object that is a best copy available, the method comprising:
   checking whether an optimization flag has been set;
   if the optimization flag has been set, performing the following acts (1)-(3) in order:
   (1) attempting to locate a local copy of the object; and if the local copy of the object is located, retrieving the local copy; but if (1) fails to locate the local copy, then
   (2) attempting to locate a remote copy of the object; and if the remote copy of the object is located, retrieving the remote copy of the object; but if (2) fails to locate the remote copy of the object, then
   (3) attempting to locate a remote web service object;
   if the optimization flag has not been set, performing act (3) without performing act (1) and act (2);
   wherein at least one of (1) and (2) comprises carrying out a Java Naming and Directory Interface (JNDI) search for the copy of the object.

2. The method as claimed in claim 1, further comprising for both (1) and (2):
   carrying out the Java Naming and Directory Interface (JNDI) search for the copy of the object;
   if the JNDI search locates the copy of the object, retrieving the copy located by the JNDI search.

3. The method as claimed in claim 1, further comprising, if a remote web service object is located, retrieving the copy of the remote web service object located.

4. The method as claimed in claim 1, further comprising prior to (1) attempting to locate the copy of the object in a cache.

5. The method as claimed in claim 1, further comprising caching a retrieved object.

6. The method as claimed in claim 1, wherein (1) further comprises attempting to locate the local copy of the object using Java Virutal Machine.

7. The method as claimed in claim 1, further comprising, in order to perform act (1):
   creating or retrieving an initial context or a link to the initial context;
   creating a local object reference.

8. A network node for locating a copy of an object across a network, the node comprising a processor which is adapted to locate the copy of object that is a best copy available by:
   checking whether an optimization flag has been set;
   if the optimization flag has been set, performing the following acts (1)-(3) in order:
   (1) attempting to locate a local copy of the object; and if the local copy of the object is located, retrieving the local copy; but if (1) fails to locate the local copy, then
   (2) attempting to locate a remote copy of the object; and if the remote copy of the object is located, retrieving the remote copy of the object; but if (2) fails to locate the remote copy of the object, then
   (3) attempting to locate a remote web service object;
   if the optimization flag has not been set, performing act (3) without performing act (1) and act (2);
   wherein at least one of (1) and (2) comprises carrying out a Java Naming and Directory Interface (JNDI) search for the copy of the object.

9. The network node as claimed in claim 8, wherein the processor is further adapted, for both (1) and (2), to:
   carry out the Java Naming and Directory Interface (JNDI) search for the object;
   if the JNDI search locates the copy of the object, retrieve the copy located by the JNDI search.

10. The node as claimed in claim 8, wherein (1) further comprises attempting to locate the local copy of the object using Java Virutal Machine.

11. The node as claimed in claim 8, further comprising, in order to perform act (1):
    creating or retrieving an initial context or a link to the initial context;
    creating a local object reference.

12. A computer-readable non-transitory medium comprising instructions that, when executed on a processor, perform a method of locating an object across a network, the method comprising:
    checking whether an optimization flag has been set;
    if the optimization flag has been set, performing the following acts (1)(3) in order:
    (1) attempting to locate a local copy of the object; and if the local copy of the object is located, retrieving the local copy; but if (1) fails to locate the local copy, then
    (2) attempting to locate a remote copy of the object; and if the remote copy of the object is located, retrieving the remote copy of the object; but if (2) fails to locate the remote copy of the object, then
    (3) attempting to locate a remote web service object;
    if the optimization flag has not been set, performing act (3) without performing act (1) and act (2);
    wherein at least one of (1) and (2) comprises carrying out a Java Naming and Directory Interface (JNDI) search for the copy of the object.

13. The computer-readable medium as claimed in claim 12, the method further comprising, for both (1) and (2):
   carrying out the Java Naming and Directory Interface (JNDI) search for the object;
   if the JNDI search locates the copy of the object, retrieving the copy located by the JNDI search.

\* \* \* \* \*

UNITED STATES PATENT AND TRADEMARK OFFICE
CERTIFICATE OF CORRECTION

PATENT NO.        : 8,707,325 B2                                              Page 1 of 1
APPLICATION NO.   : 13/063053
DATED             : April 22, 2014
INVENTOR(S)       : Seyvet It is certified that error appears in the above-identified patent and that said Letters Patent is hereby corrected as shown below:

In the Specification

In Column 1, Line 24, delete "wises" and insert -- wishes --, therefor.

In Column 1, Lines 26-38, delete "Service locators.......of control." and insert the same at Line 25, after "query." as a continuation of paragraph.

In Column 1, Line 29, delete "EJBHome" and insert -- EJB home --, therefor.

In Column 1, Line 59, delete "know." and insert -- known. --, therefor.

In Column 2, Line 58, delete "if 1" and insert -- If 1 --, therefor.

In Column 2, Line 59, delete "if 2 failed try to locate a remote web service object" and insert -- If 2 failed try to locate a remote web service object. --, therefor.

In the Claims

In Column 6, Line 8, in Claim 6, delete "Virutal" and insert -- Virtual --, therefor.

In Column 6, Line 40, in Claim 10, delete "The node" and insert -- The network node --, therefor.

In Column 6, Line 42, in Claim 10, delete "Virutal" and insert -- Virtual --, therefor.

In Column 6, Line 43, in Claim 11, delete "The node" and insert -- The network node --, therefor.

In Column 6, Line 54, in Claim 12, delete "(1)(3)" and insert -- (1)-(3) --, therefor.

Signed and Sealed this
Twenty-eighth Day of October, 2014

Michelle K. Lee
*Deputy Director of the United States Patent and Trademark Office*